UNITED STATES PATENT OFFICE.

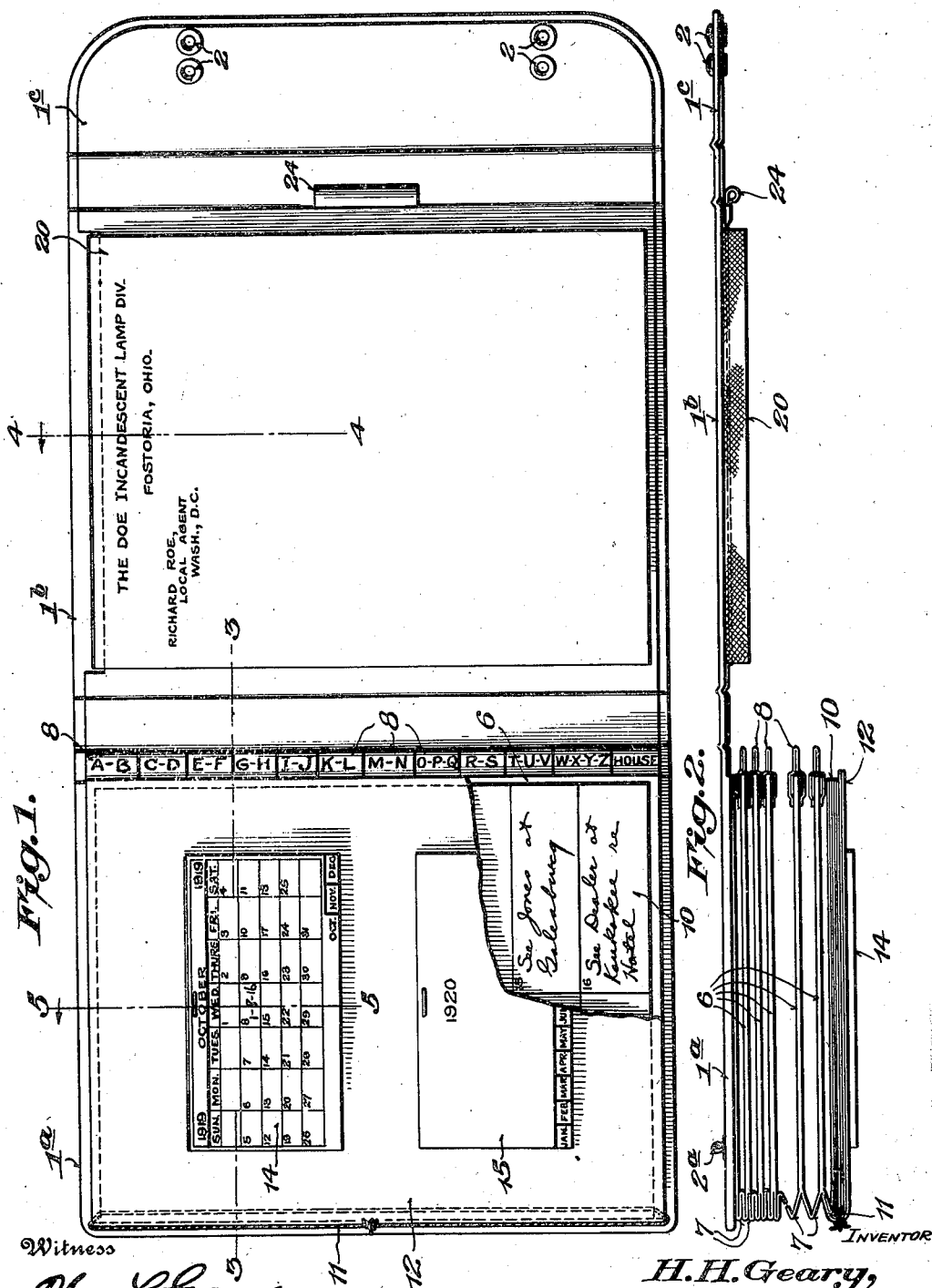

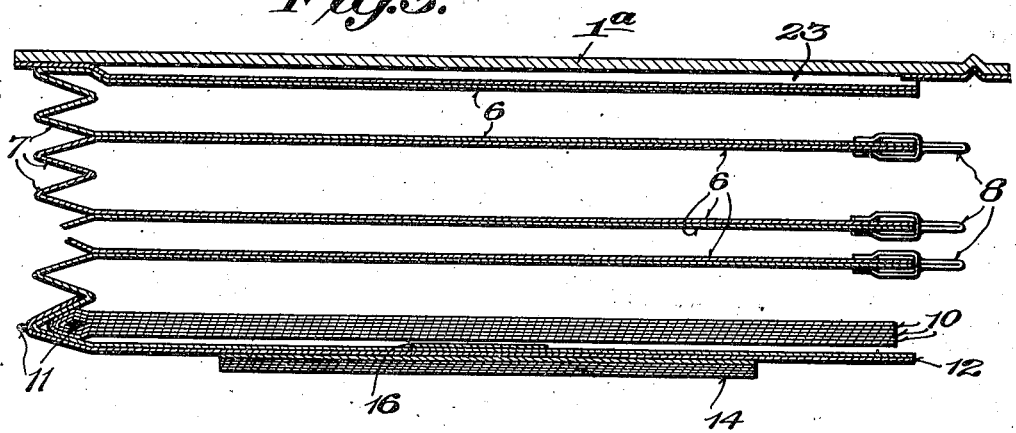
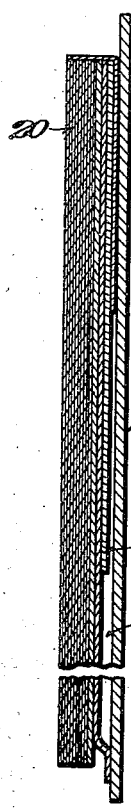
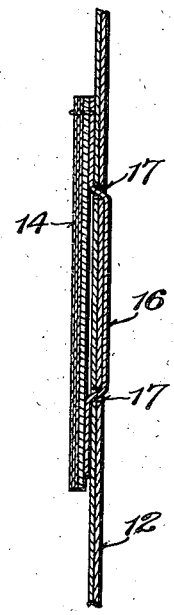
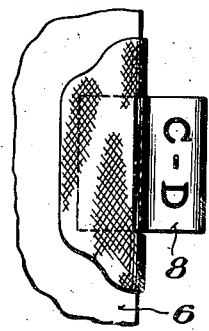
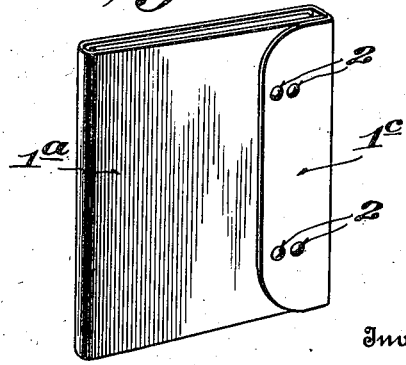

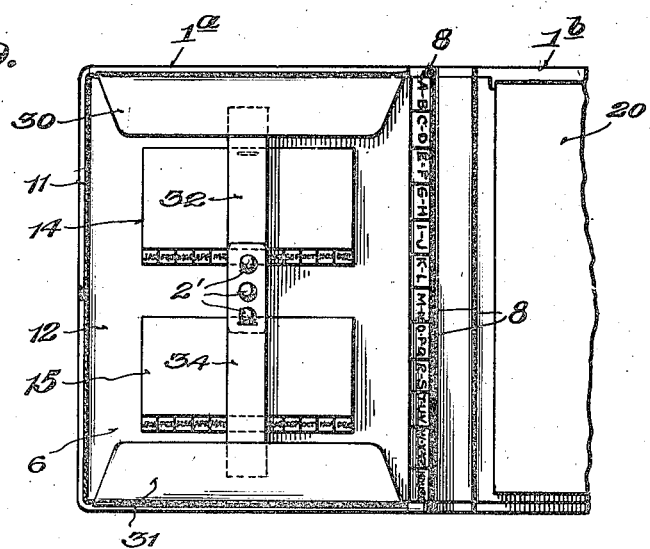
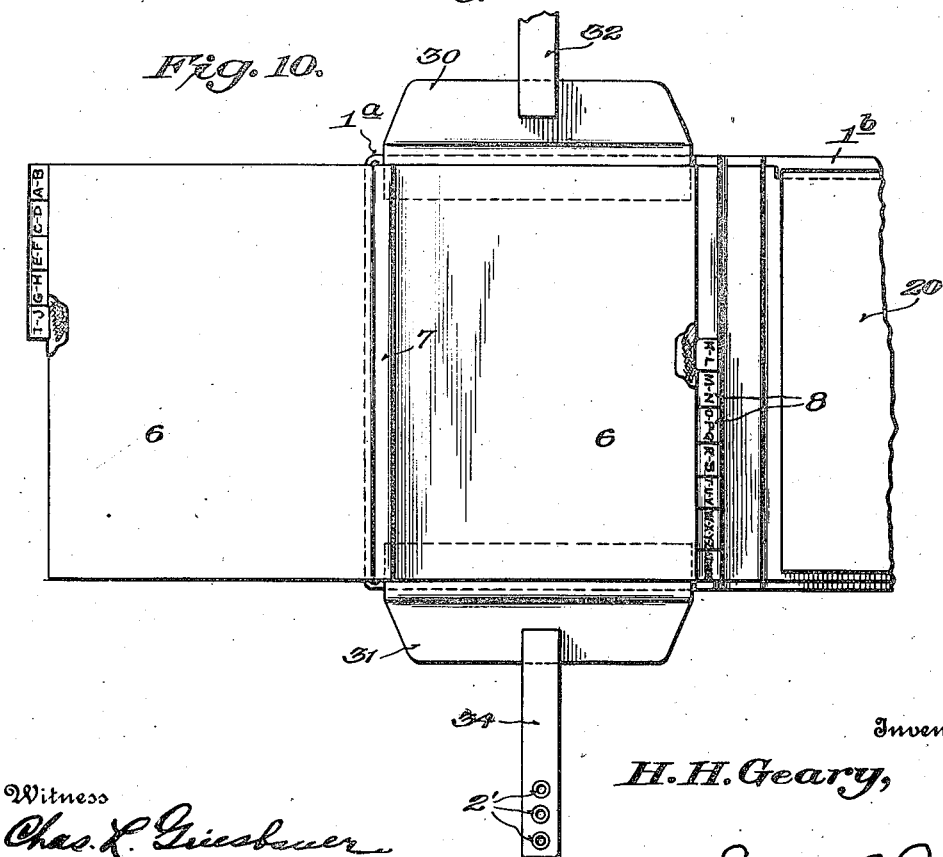

HENRY H. GEARY, OF FOSTORIA, OHIO.

SALESMAN'S PORTABLE OFFICE.

1,353,530.

Specification of Letters Patent.   Patented Sept. 21, 1920.

Application filed November 8, 1919. Serial No. 336,760.

*To all whom it may concern:*

Be it known that I, HENRY H. GEARY, a citizen of the United States, residing at Fostoria, in the county of Seneca and State of Ohio, have invented certain new and useful Improvements in Salesmen's Portable Offices, of which the following is a specification.

This invention relates to a portable correspondence, filing and reminder outfit especially adapted for the use of traveling salesmen.

The principal object of my invention is to provide means for systematizing the work of the salesman by classifying his correspondence, memoranda, etc., and so connecting it with a reminder system and the dates of the calendar that it will be practically impossible to overlook matters requiring attention at certain times and places.

A further object is to provide a safe, secure, and compact means for the carrying of papers, etc., in such form that they may be referred to immediately at any time.

In the following description I shall refer to the accompanying drawings in which—

Figure 1 is a plan view of an apparatus or outfit embodying my invention; Fig. 2, is a top end view thereof; Fig. 3, is a transverse sectional view on the line 3—3 of Fig. 1; Figs. 4 and 5 are sectional views on the lines 4—4 and 5—5, respectively of Fig. 1; Figs. 6 and 7 are enlarged detail views showing the manner of securing the index tabs to the leaves of the expansible pocket-file; Fig. 8 is a perspective view on a reduced scale of the apparatus or device in closed or folded position; Fig. 9 is an inside plan view of a modified form of the pocket-file side of the portfolio; and Fig. 10, is a plan view of the same with a portion of the pocket sections swung outwardly. The outfit or device is substantially in the form of a portfolio having a cover of suitable stiff flexible material, preferably leather bound, and comprising opposite sections 1$^a$, 1$^b$ which may be folded together and secured in closed position by the snap fastener socket members 2 on the closure flap 1$^c$ engaging the buttons 2$^a$ on the back of the cover section 1$^a$; two socket members being provided to provide for an expansion of the contents.

An expansible pocket-file for the reception of letters and other papers is secured to the inner side of the cover section 1$^a$ and consists of a series of leaves or partitions 6 connected along the outer side edges by bellows folds 7, so that the leaves or partitions may be flattened together and expanded or separated as the papers are filed in the inclosed spaces or pockets. It is very convenient to separate the series of pockets to expose the contents of any particular pocket by swinging the several pockets preceding the one to be examined, outwardly into alinement with the cover in the manner illustrated in Fig. 10 and this may be done because the leaves or partitions are unconnected at the top and bottom edges.

It sometimes happens that a salesman prefers to have the top and bottom edges connected and in such cases I continue the gussets or bellows folds along the top and bottom as well as the outside edge of the leaves as is obvious without illustration. The pockets open inwardly toward the hinge portion of the cover and the inner edges of the leaves or partitions are provided with index tabs 8. By arranging the pocket-file in this manner it is practically impossible to lose any of the contents, the pockets being clamped tightly when the portfolio is in closed position with the closure flap fastened.

Superposed upon the pocket-file is a reminder note book consisting of a suitable number of blank leaves or pages 10, each ruled to divide the page into a number of squares or spaces which are numbered consecutively. This note book may be fastened in the uppermost pocket of the file by a cord 11. A cover sheet 12 of card-board or other suitable material protects the leaves and forms a support for pad calendars 14, 15, which are provided at the back with tongues or tabs 16 to be inserted in slits 17 in the cover sheet in the manner shown in Fig. 5. These calendars are provided with index tabs designating the months and each leaf is divided as usual to provide spaces which bear numbers corresponding with the days of the month, these spaces being large enough to receive the index numerals or other reference characters which the salesman may insert as hereinafter described.

The other cover section 1$^b$ is provided upon the inner side with a pocket 18 closed upon the sides and bottom and open at the top in which sheets of carbon copying paper may be carried. A tablet of letter paper 20 which may have a blotter cover and have printed thereon the letterhead of the house or concern with which the salesman is connected, is secured to the inner side of the cover by means of a tongue or tab 21 attached to the back of the tablet and inserted in said pocket as shown in Fig. 4.

A pocket 23 may be provided upon the inner side of the cover section 1ª, under the pocket-file to receive envelops, forms and other papers. One or more loops 24 may be secured upon the inside of the cover adjacent the flap to hold pens and pencils.

In the construction illustrated in Fig. 1, I have not provided any closure means for the pockets at the top and bottom, as I have found that there is very little danger of the papers slipping out of the spaces between the leaves, which I have designated "pockets" even when the portfolio is opened with the cover sections laid out flat in writing position, and when the cover is in closed position as shown in Fig. 8, with the snap fasteners locked, the contents are clamped securely. However, inasmuch as it is sometimes deemed advisable to completely inclose the pockets when the parts are closed, I have devised the form shown in Figs. 9 and 10, in which flaps 30 and 31, of suitable flexible material, are secured to the inside of the cover section 1ª under the pocket-file, so that they may be brought over the file when it is closed and secured by straps 32, 34 which are attached to the flaps and provided with snap fasteners 2′, a series being provided to accommodate the expansion of the pocket-file or portfolio. The parts of the portfolio may be separated and laid out flat to expose the contents of any pocket by throwing the flaps 30, 31 back out of the way as illustrated in Fig. 10.

The modern traveling salesman is a business man who is working constructively to establish and build up a trade in his territory for his house or company and in order to be successful he must systematize the large number of details so that he may act with precision. He cannot take a matter up intelligently or conclusively from memory of what has gone before. He must have his correspondence showing actual facts, figures, dates, details, etc., before him in proper chronological order. My invention provides a place for carrying all correspondence, etc., filed accurately for quick reference with means for reminding of every detail needing attention throughout the territory to be covered. The coöperative relation between the several parts of my device and the manner of using it will be understood from a few examples.

Suppose, for instance, the salesman learns when in Kankakee of a new hotel for which ground is just being broken, which will require a lot of his goods in about four months, i. e., about January 20th. In the first vacant space in the reminder note book, say space 16, he writes some such notation as—

"See about new hotel at Kankakee. Write dealer January 4th, arrange to go there about January 20th."

He then places the number 16 in the calendar space for January 4th and perhaps also at January 12th. As he cannot fail to habitually glance at his calendar every day when he opens his "portable office" to attend to his correspondence on January 4th he observes the number 16 and upon turning to the space designated by that numeral in the reminder note book portion or "tickler," he finds the note regarding the hotel at Kankakee. Upon writing to his dealer in that city he files the carbon copy of his letter in the pocket-file under the first letter of the place, viz., K and upon receiving a reply from the dealer stating the progress in the construction of the hotel and information regarding the materials required, he also files this under K, probably pinned to a copy of the letter to which it replies. On January 12th he again observes the numeral 16 on the calendar and upon referring to the corresponding space in the reminder note book his memory is refreshed that he must immediately arrange to go to Kankakee on the 20th and upon opening the pocket-file at the letter K he has all correspondence and any memoranda giving details in regard to the goods which will be required by the hotel, etc. It will be observed that the notation on the calendar merely refers him to a certain space in the reminder note book portion; that the memorandum given in said reminder portion is a brief or notice of the particular item from which index letter of the pocket-file is obtained where the full details are found.

A salesman on the road receives numerous letters, copies of letters, etc., from his house or firm regarding matters to be attended to when he arrives at certain towns. He files the correspondence in the proper pocket of the pocket-file or portfolio under the first letter of the town in each case. On the night before arriving at each town the salesman takes from the pocket-file all of the correspondence and notes filed under the first letter of that place and is thus completely reminded and informed and apprised in regard to his duties and engagements in that town. His own letters and reports are written on the tablets of letter-heads 20 and the carbon copy is filed in the portfolio under the appropriate index letter.

The advantages to be derived from the use of my invention will be appreciated especially by traveling salesmen and by those familiar with the difficulties which attend the systematic conduct of correspondence and business of the traveling man. The provision of a reminder note book, which forms the intermediate connecting link between the notations upon the calendar and the complete details and correspondence in the portfolio, makes it unnecessary to search through the entire correspondence when it is desired to ascertain merely what matters must be attended to. It also furnishes a concise summary of the items covered by the correspondence so that the salesman can obtain a general survey of the work to be accomplished in a given town or his entire territory very quickly.

Many other ways of using this device will be apparent to the traveling salesman and those familiar with his duties. I have described in detail the particular constructions illustrated in the accompanying drawings but it is evident that various changes and modifications, may be made without departing from my invention.

I claim:—

1. In appliances of the kind specified, the combination of a reminder form comprising a leaf or series of leaves having spaces numbered serially for recording brief data of a project or names and addresses or other indexable data, a calendar having spaces for each day upon which reference characters may be placed corresponding to the desired number or numbers designating the spaces of said reminder which contain data regarding future engagements, projects, etc., and a pocket-file or portfolio comprising a series of pockets to receive correspondence and information briefly referred to in said reminder spaces.

2. An appliance of the kind specified, comprising a cover having foldable sections, a pocket-file or portfolio secured to one section and having the outer side closed by gussets or bellows folds, the pockets opening inwardly, a reminder form having leaves divided into spaces that are numbered serially, a calendar form having spaces corresponding to the days of each month in which reference characters may be placed corresponding to the numbers designating any of said reminder spaces, and a writing pad or tablet secured to the opposite cover section.

3. An appliance of the kind specified, comprising a cover having foldable sections, provided at one end with a closure flap, a pocket-file or portfolio secured to one section and having the outer side closed by gussets or bellows folds, the pockets opening inwardly, the partitions between the pockets carrying marginal indexed tabs, a reminder form having leaves divided into spaces that are numbered serially, a calendar form having spaces corresponding to the days of each month in which reference characters may be placed corresponding to the numbers designating any of said reminder spaces, and a writing pad or tablet detachably secured to the opposite cover section.

4. An appliance of the kind specified, comprising a cover having foldable sections, a portfolio secured to one section and having pockets opening inwardly, the outer side being closed by gussets or bellows folds, means for closing the top and bottom edges of the portfolio, a reminder form having leaves divided into spaces that are numbered serially, a calendar form having spaces corresponding to the days of each month in which reference characters may be placed corresponding to the numbers designating any of said reminder spaces, and a writing pad or tablet secured to the opposite cover section.

In testimony whereof I affix my signature.

HENRY H. GEARY.